United States Patent [19]

Burdette

[11] 4,018,188

[45] Apr. 19, 1977

[54] REINFORCED CONCRETE SLAT FLOOR

[76] Inventor: James Reuben Burdette, 418 Moody, Martin, Tenn. 38237

[22] Filed: June 10, 1975

[21] Appl. No.: 585,717

[52] U.S. Cl. ............................................ 119/28
[51] Int. Cl.² ...................................... A01K 1/00
[58] Field of Search ............... 119/28, 16; 249/97; 52/583

[56] References Cited

UNITED STATES PATENTS

| | | | |
|---|---|---|---|
| 1,194,305 | 8/1916 | McMillan | 52/583 |
| 3,762,372 | 10/1973 | Mente et al. | 119/28 |
| 3,915,422 | 10/1975 | Nobbe | 249/97 |

Primary Examiner—Hugh R. Chamblee
Attorney, Agent, or Firm—Mason, Fenwick & Lawrence

[57] ABSTRACT

A load distributing and interconnecting slat floor wherein each slat has an interlocking connection with adjacent slats at several locations along the length of the slats to distribute loads imposed on any one slat to the adjacent slats and a method utilizing separable forms for manufacturing the load distributing and interconnecting slat floor.

5 Claims, 7 Drawing Figures

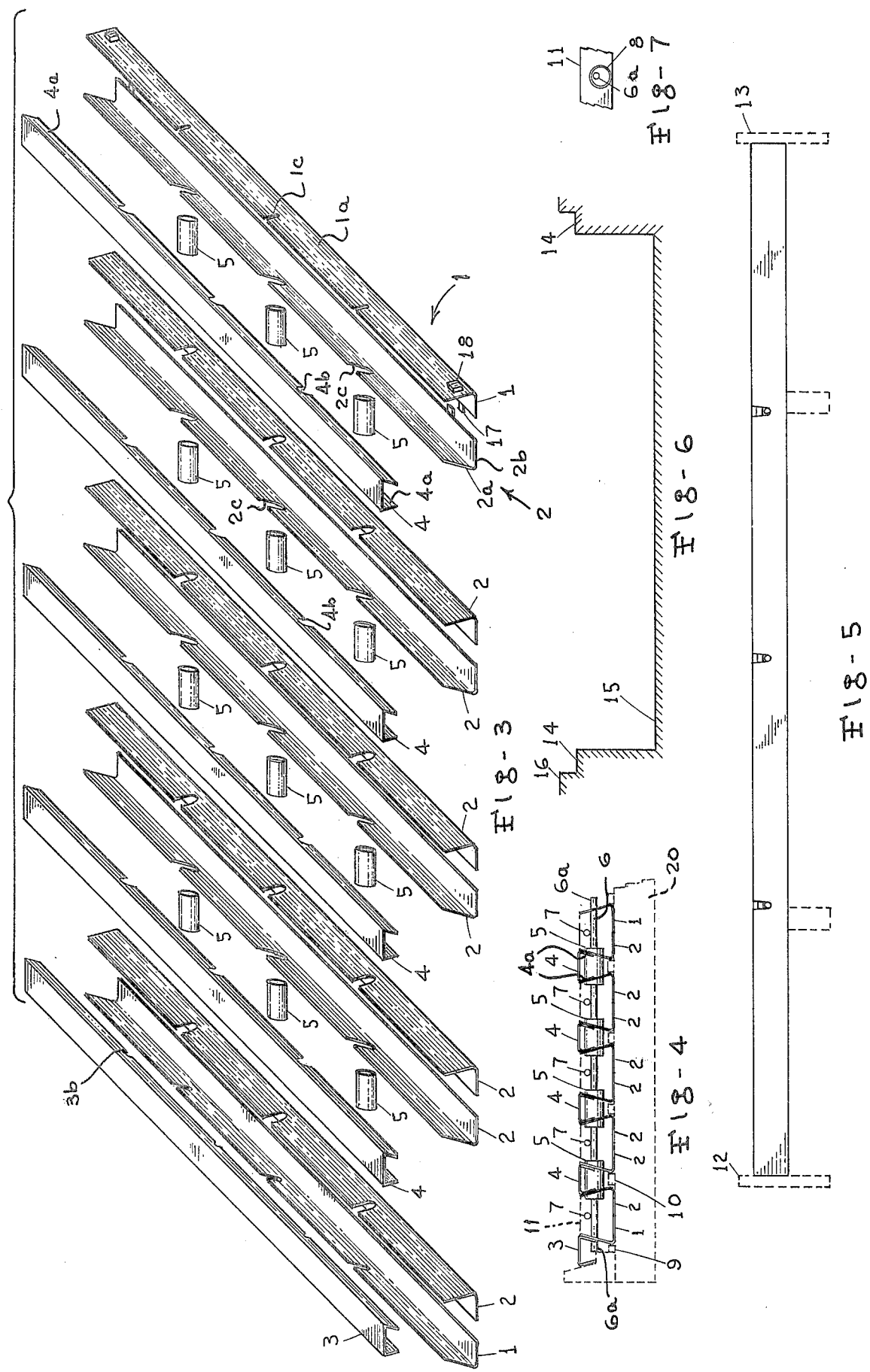

REINFORCED CONCRETE SLAT FLOOR

BACKGROUND AND OBJECTS OF THE INVENTION

Slat floors are commonly used to support loads while simultaneously permitting waste and debris to drop through the spaces between slats to a collection areas below the slats. The accumulated waste and debris may then be automatically removed, either continuously or periodically for disposal.

For example, in beef feedlot operations, reinforced concrete slat floors are located in strategic areas such as feeding and watering. The slats commonly used in these applications are 8 feet long with a space of approximately 1½ inches between slats. The floors are created by positioning the slats over collection pits with their ends resting on support ledges adjacent the pit and with their top surfaces flush with the surrounding floor. The slats taper inwardly so that the space between the slats is wider at the bottom than at the top thereby preventing clogging of the spaces by the accumulation of waste and debris. As the cattle live and move around on these floors the manure from the cattle falls through the spaces between the slats and into the collection pit. The manure is then conveyed to a holding tank for later distribution on the field to provide fertilizer and organic material to assist in building the soil for plant growth.

Some slat floors have been cast in place, however, these have suffered from the major disadvantage of having rough top surfaces and edges which tend to chip thereby enlarging the space between slats and decreasing the strength of the slats.

Slats are commonly formed in molds in a manufacturer's plant rather than at the user's site and are formed in an upside down position. The wearing surfaces, which include the top surfaces and sides of the slats, are formed by steel molds which can produce smooth wearing surfaces with smooth rounded corners.

With previously known slat floors, the slats have been manufactured individually and shipped to the user's site where they have been installed slat by slat which results in high installation costs.

At the time of installation, lateral support of these previously known slats has usually been provided in one of two ways: (1) after the slats are positioned, forms are set and the spaces between slats at the point where the slats rest on the supporting ledges are filled with concrete, or, (2) precast lintels having close-fitting slat supporting notches in their upper surfaces are placed on the supporting ledges and the slats are then placed in the close-fitting notches in the lintels. Adequate lateral support is necessary to prevent the slats from tipping sideways and restricting or closing the openings between the slats.

With these conventional slat floors, it is necessary for each individual slat to be fabricated with adequate strength to support the largest combination of concentrated loading which might occur on any individual slat during the lifetime of the slat floor. For example, four or five heavy cattle might stand with their front feet on the same slat. Since the front feet carry the majority of the animal's weight, this combination produces the maximum load on the slat. Obviously, adjacent slats will carry little or no load as they will be shielded by the bodies and heads of these animals. Since this maximum load can occur on any slat, each slat must be designed to carry the maximum load.

These previously known slat floors have been expensive to manufacture, transport and install because they are heavy and must be individually installed slat by slat at the user's site.

Therefore, it is the primary object of this invention to provide a new and improved slat floor and novel method of manufacture utilizing separable forms.

Another object of the present invention is to provide a novel slat floor which is interconnected and provides a significant reduction in the required strength of individual slats and therefore material cost and shipping weight, of slat floors.

A further object of the present invention is to provide a method of manufacturing a load distributing and interconnecting slat floor which permits the casting of two or more steel-reinforced concrete slats rigidly connected together with the desired spacing in such a way that all connecting steel is completely encased in concrete.

An additional object of the present invention is to provide a reinforced concrete slat floor which permits rigid connection of slats to adjacent slats during field installation in such a way that all connecting steel rods are completely encased in concrete thereby avoiding the corrosive effect of manure.

A still further advantage of the present invention is to provide slat floors which materially reduce the field installation costs.

BRIEF DESCRIPTION OF DRAWINGS

A better understanding of the subject invention will be enabled when the following detailed description is read in conjunction with the appended drawings in which:

FIG. 3 is an exploded perspective view of the forms and connectors necessary to practice the method of the present invention in forming a five slat unit;

FIG. 4 is an end view of the forms of FIG. 3 completely assembled with longitudinal reinforcing rods and interconnecting transverse reinforcing rods in position;

FIG. 5 is a side elevational view showing the forms of FIG. 3 in relation in the manufacturer's pouring table;

FIG. 6 is a sectional view of a collection pit having ledges to receive and support a slat floor of the present invention;

FIG. 7 is a fragmentary end view showing the relative position of a cylindrical sleeve and a transverse reinforcing rod during field installation.

DETAILED DESCRIPTION OF A PREFERRED EMBODIMENT

Figure 1:
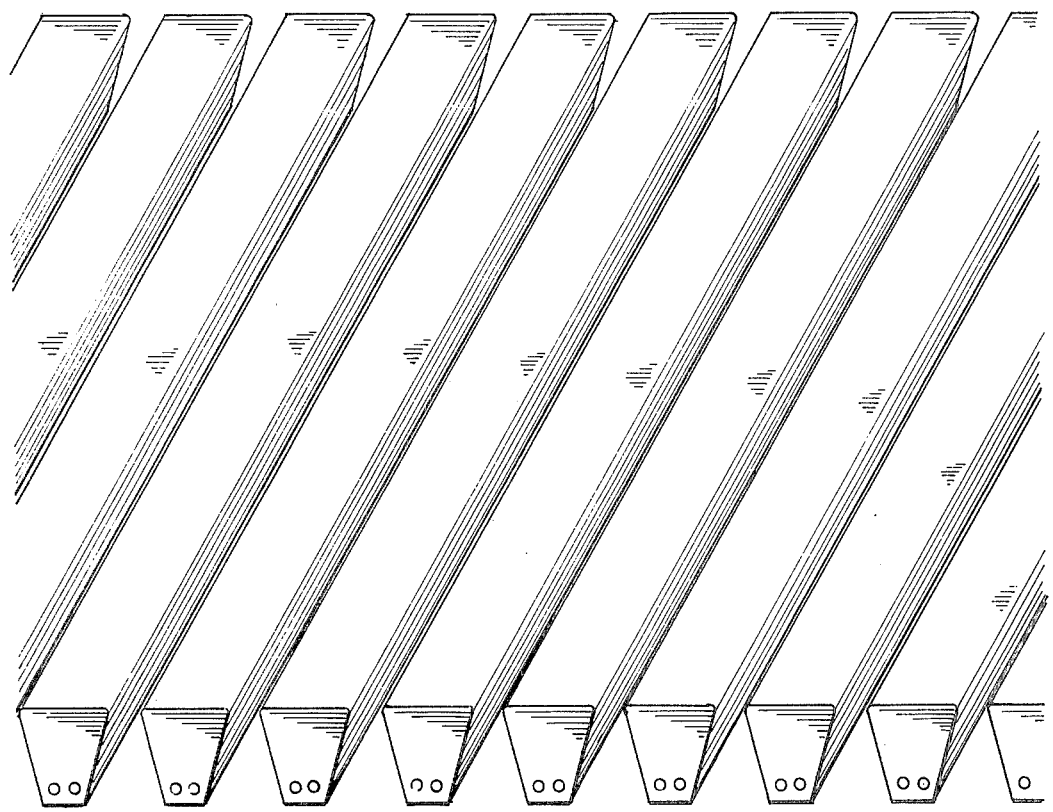
FIG. 1 is a perspective view illustrating conventional concrete slats as they would be positioned in a floor.
Figure 2:
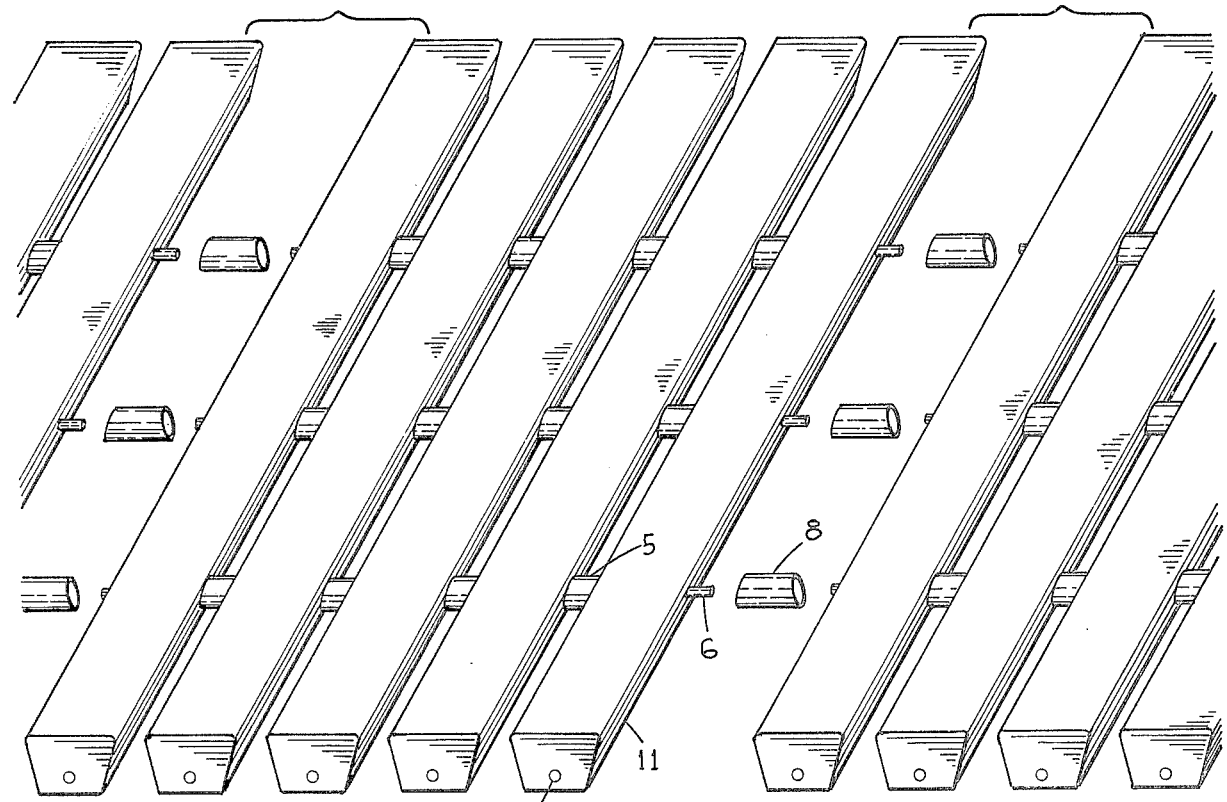
FIG. 2 is an exploded perspective view of a preferred embodiment of the present invention showing a five slat module ready for connection to other multiple slat modules.

Referring to the drawings there is shown in FIG. 2 a slat floor module of the present invention which includes elongated generally trapezoidal concrete slats 11 having longitudinal reinforcing rods 7 encased in the slat and extending over the length of the slat. Transverse reinforcing rods 6 extend at right angles to the longitudinal rods 7 through the slats 11 at locations spaced at quarter lengths from the ends of the slats and at the center of the slat. Surrounding the transverse rods are sleeves 5 which are filled with concrete to form a rigid interconnection between adjacent slats.

The casting of slat modules having slats interconnected in groups of five is accomplished as follows.

The casting requires five different forms. An outer form 1 is L shaped with a side wall 1a and a bottom wall 1b forming a slightly acute angle to create inwardly sloping sides on the slats as shown in FIG. 4. Extending downwardly from the upper edge of the side wall 1a are three transverse rod slots 1c located at intervals of one quarter lengths along the form and into which the transverse rods 6, as indicated in FIGS. 4 and 5, are placed prior to casting. The rod slots are semi-circular at the lower ends thereof. An inner form 2 is similar to the outer exterior forms 1 except sleeve receiving slots 2c are larger than transverse rod slots 1c and are semi-circular at the lower ends thereof.

Outer forms 1 and inner forms 2 may be turned 180° to make either a right hand side or a left hand side. Tabs 17 are provided at both ends on all the inner forms 1 and the outer forms 2 (shown only on one set) to insure proper alignment.

An inner cap form 4 is U-shaped with the side walls 4a sloping inwardly to conform to the slope of the side wall 2a of the inner form 2. The side walls 4a have sleeve slots 4b which are positioned at one quarter length intervals along the length of the form and are semi-circular at the upper ends thereof. Concrete encasement of the transverse reinforcing rod 6 is provided by a sleeve form 5 which may simply be a section of plastic tubing. The sleeve slots 2c and 4b when positioned over the sleeve form 5 as indicated in FIG. 4 form a concrete tight seal against the sleeve.

An outer cap form 3 is similar to cap form 4 except it has reinforcing rod slots 3b which cooperate with the reinforcing rod slots 1c in the outer forms 1 to create a concrete tight seal around the reinforcing rod 6 as indicated at the left of FIG. 4.

The forms 1, 2, 3 and 4 are cleaned and coated with separating agent. The forms are then assembled on the manufacturer's pouring table 20 as shown in FIG. 4. An outer form 1 is first positioned at one end of the table against a predetermined stop 9. Next an inner form 2 is positioned against the outer form 1 inside a second stop 10 which is located to give the correct spacing between forms; the stops all being permanently attached to the manufacturer's table 20. Another form 2 is then positioned against the opposite side of the second stop 10.

The procedure is then repeated until a total of two outer forms 1 and eight inner forms 2 are positioned as shown in FIG. 4 with the outer forms 1 on the outside.

Four plastic tubular sleeves 5 are then positioned on the transverse reinforcing rod 6 of appropriate length and the rod is positioned with its ends in the reinforcing rod slots 1c in the outer forms 1. With the transverse rod 6 supported at each end, the sleeves 5 are maneuvered into the sleeve slots 2c in the inner forms 2 as shown in FIG. 4. This is easily accomplished since the inside diameter of the sleeve 5 is approximately three times the diameter of the rod 6.

The diameter of the semi-circle at the bottom of the rod slots 1c in the outer forms 1 is equal to the diameter of the rod 6. These slots have a slight positive draft angle for ease of assembly. The diameter of the semi-circle at the bottom of the sleeve slots in the inner forms 2 is slightly less than the outside diameter of the plastic tubular sleeves 5 to provide a slight interference fit. This prevents unwanted movement of pipe sleeves 5 during the concrete pour. The sleeve slots 2c in the inner forms 2 also have a slight positive draft angle for ease of assembly.

Two more connecting rods 6, each with four sleeves 5, are placed in like manner, filling all the slots in the outer forms 1 and the inner forms 2.

Two outer cap form 3 and four inner cap forms 4 are positioned as shown in FIG. 4. The diameter of the semi-circles at the bottom of the rod slots 3a is the same as the diameter of the transverse reinforcing rods 6. The diameter of the semi-circles at the bottom of the sleeve slots 4b in the inner cap form 4 is the same as the outside diameter of the pipe sleeves 5.

The outer caps 3 and inner caps 4 close all gaps and prevent any concrete from spilling into the space between the slats.

Longitudinal reinforcing rods 7 are the same length as the slats being poured. Five such rods, one per slat, are positioned in the forms as shown in FIG. 4 and are supported at three points by the transverse reinforcing rods 6. The transverse rods 7 are wired to rods 6 at each end with wire clips or the like (not shown) or, they may be held in position by fixtures on the pouring table 20.

This completes the assembly of one set of forms for a five slat combination. If the pouring table has a capacity for 100 slats, then the above-described procedure would be repeated nineteen more times.

When all of the forms are assembled, the ends of the forms are closed by flat end plate forms 12 and 13 which are part of the manufacturer's pouring table as indicated in FIG. 5.

Concrete of appropriate strength and slump, using three-quarter inch and smaller crushed stone, is now dumped, spread, vibrated and screeded. During vibration, concrete flows into and fills the tubular sleeves 5 to rigidly connect the slats 11 into groups of five slats and to encase the transverse reinforcing rods 6 except for the rod ends 6a which extend beyond outer forms 1. These rod ends are encased during field installation.

After the pouring operation is complete, the outer caps 3 and the inner caps 4 may be immediately removed and cleaned with rust inhibiting water.

After the proper length of curing time, the five-slat groups are turned upside down and the outer forms 1 and the inner forms 2 are removed. Striking plates 18 are provided on both ends of all inner forms 1 and outer forms 2 (shown on only one form in FIG. 3) to facilitate the break-out. The tubular sleeves 5 remain in position and become a part of the floor.

By reference to FIG. 2, it will be seen that the connections between slats present a natural pick-up point and that a 4-point scissors type pick-up mechanism could be made to work in conjunction with a hoist for ease in handling while stacking, loading and unloading. Less damage will occur while handling the slat floors of the present invention in the green state than there is with previously known slats which have no natural pick-up point.

The on-site, or field installation of the slat floor of the present invention is easily accomplished. The slat floor is constructed over a pit 15 shown in FIG. 6 and the ends of the slats are supported on a ledge 14 with the top surface of the slats 11 flush with the floor 16.

Installation is most easily accomplished with a boom type hoist mounted in the center of the flat bed trailer on which the slats are hauled with the trailer being driven alongside the pit. If it is not possible to drive alongside the pit, then a ground located mobile hoist would be required. In either case, a thin layer of grout is spread on the ledges 14 and the first five-slat module is set into place at one end of the pit.

Three galvanized pipe sleeves 8, (shown in FIG. 2 and 7) are filled with grout. A worker, while holding a thumb over one end, of the pipe sleeves 8 places the sleeves over the exposed ends of the transverse rod 6 of the last slat module. This position, as shown in FIG. 7, is stable because the pipe sleeve 8 rests on the transverse reinforcing rod end 6a.

The worker then steps out of the way and the next five-slat module is moved into position a few inches above the ledge 14. The worker tilts the module slightly forward causing the exposed transverse rod ends 6a to make connection low enough to penetrate the grout-filled pipe sleeves 8. He then pushes the swinging slat group forward to cause the exposed rod end 6a to penetrate the pipe sleeves 8 and leans against the swinging slats as the hoist operator steadily lowers the slats into place on the ledge 14. A squeeze out of grout will be observed as the penetrating rod displaces grout in the pipe sleeve ensuring complete coverage of the reinforcing rods.

The worker then fills three more pipe sleeves 8, places them over the exposed rod ends 6a and the procedure is repeated until all slats are installed.

The number of slats required to construct a given floor area will be predetermined. If a four-slat group is required, simply by reducing the length of three connecting rods 6 and omitting one pair of numeral 2 forms, a four-slat group can be manufactured. In this manner any number of slats can be manufactured to be interconnected with any other combination.

When the last slat module has been set in accordance to the above described procedure, the installation is finished. There is no need for the expensive forming and filling of the space between slat ends. In the slat floor module of the present invention, lateral support is already provided at three intermediate points.

This slat floor can be installed nearly as quickly as the truck can be unloaded and since five slats are handled at once, the installation of the new slat floor will go much more quickly than the installation of the previously known floors.

It is to be understood that numerous modifications of the disclosed embodiments of the subject invention will undoubtedly occur to those with skill in the art and the spirit and scope of the invention is limited solely in light of the appended claims.

I claim:

1. A load distributing and interconnecting slat floor module which may be connected to other interconnecting slat floor modules for supporting loads while simultaneously permitting waste and debris to drop through spaces between the slats, said slat floor module comprising spaced apart elongated slats of trapezoidal cross section, each slat having a top surface wider then the bottom surface and generally parallel to the bottom surface and having inwardly sloping slat sides, a longitudinal reinforcing member extending along the length of the slat adjacent the bottom surface of each slat for increasing the strength of the slat, a transverse reinforcing member fixed to the slats and extending in a generally perpendicular direction between the slats and through the slats, said transverse reinforcing members being spaced from the ends of the slats and extending beyond the outer slats in each module, and means for rigidly connecting the transverse reinforcing members between adjacent modules thereby providing load distributing interconnections between the slats and adjacent modules.

2. The load distributing and interconnecting slat floor module of claim 1 wherein the slats are formed of concrete and wherein the longitudinal reinforcing member comprises a steel reinforcing rod encapsulated in a lower portion of each slat.

3. The load distributing and interconnecting slat floor module of claim 2 wherein the tranverse reinforcing members comprises transverse steel reinforcing rods which extend through each slat at spaced apart locations along the slats, said transverse rods having a concrete encapsulation around the portions of the rods extending between the slats and extending between the modules to provide the rigid connecting means.

4. A method for connecting a load distributing and interconnecting slat floor module at the user's site with a rigid, moment-resisting splice to extend the load distributing feature from module to module wherein the slat floor modules have transverse reinforcing rods at spaced apart locations along the slats of each module with the ends of the transverse rods extending beyond the outer slats, said method comprising positioning the first slat floor module, positioning the second slat floor module with the ends of the transverse rods of the first module adjacent the ends of the transverse rods of the second module, surrounding the transverse rods extending between the outer slats of the first and second slat floor modules with rigid tubular members having passageways therethrough with cross-sectional areas larger than the cross-sectional areas of the transverse rods, filling the passageways around the transverse rods with a hardenable material, and hardening said material in the passageways.

5. The method of claim 4 wherein the tubular members are steel pipe sleeves and the hardenable material is concrete.

* * * * *